US010788311B2

(12) United States Patent
Hauger et al.

(10) Patent No.: US 10,788,311 B2
(45) Date of Patent: Sep. 29, 2020

(54) MICROSCOPE SYSTEM AND METHOD FOR AUTOMATED ALIGNMENT OF A MICROSCOPE

(71) Applicant: CARL ZEISS MEDITEC AG, Jena (DE)

(72) Inventors: Christoph Hauger, Aalen (DE); Gerald Panitz, Ellwangen (DE); Marco Wilzbach, Stuttgart (DE); Stefan Saur, Aalen (DE)

(73) Assignee: CARL ZEISS MEDITEC AG, Jena (DE)

( * ) Notice: Subject to any disclaimer, the term of this patent is extended or adjusted under 35 U.S.C. 154(b) by 549 days.

(21) Appl. No.: 15/064,250

(22) Filed: Mar. 8, 2016

(65) Prior Publication Data

US 2016/0266369 A1 Sep. 15, 2016

(30) Foreign Application Priority Data

Mar. 9, 2015 (DE) ........................ 10 2015 103 426

(51) Int. Cl.

| | |
|---|---|
| ***G01B 9/02*** | (2006.01) |
| ***G02B 21/22*** | (2006.01) |
| ***G02B 21/36*** | (2006.01) |
| ***G02B 21/00*** | (2006.01) |
| ***G01B 11/24*** | (2006.01) |
| ***G02B 7/00*** | (2006.01) |

(52) U.S. Cl.

CPC .......... *G01B 9/02091* (2013.01); *G01B 11/24* (2013.01); *G02B 7/001* (2013.01); *G02B 21/0012* (2013.01); *G02B 21/22* (2013.01); *G02B 21/365* (2013.01)

(58) Field of Classification Search

CPC ................ G01B 11/24; G01B 9/02091; G02B 21/0012; G02B 21/22; G02B 21/365; G02B 7/001

USPC ............................................................ 348/80

See application file for complete search history.

(56) References Cited

U.S. PATENT DOCUMENTS

| | | | | |
|---|---|---|---|---|
| 4,364,629 A * | 12/1982 | Lang | A61B 1/00193 359/377 |
| 8,212,915 B1 * | 7/2012 | Clark | G11B 27/034 348/335 |
| 2008/0266655 A1 * | 10/2008 | Levoy | G02B 21/361 359/368 |

(Continued)

*Primary Examiner* — Nasim N Nirjhar

(74) *Attorney, Agent, or Firm* — Nixon Peabody LLP; Jeffrey L. Costellia

(57) ABSTRACT

A microscope system is made available, said microscope system including: a microscope with an observer beam path with at least one camera for obtaining at least one electronic image of an observation object with a deep channel with a base, a motor-driven mount and/or a motor-driven stand, on which the microscope is mounted, a detection unit for detecting the focal depth set at the microscope, an image processing unit connected to the detection unit for the receiving focal depth and connected to the at least one camera for receiving the at least one electronic image, which image processing unit establishes the image portion in the at least one electronic image constituting the base of the deep channel in the electronic image, and a control unit connected to the image processing unit for receiving the established alignment for outputting control signals.

22 Claims, 7 Drawing Sheets

(56) References Cited

U.S. PATENT DOCUMENTS

| | | | | |
|---|---|---|---|---|
| 2009/0231570 | A1* | 9/2009 | Toda | G01B 11/25<br>356/3.03 |
| 2011/0222146 | A1* | 9/2011 | Kuster | G02B 21/025<br>359/380 |
| 2013/0063565 | A1* | 3/2013 | Hara | G02B 21/008<br>348/46 |
| 2014/0211304 | A1* | 7/2014 | Nakamura | G02B 21/22<br>359/363 |
| 2014/0240457 | A1* | 8/2014 | Xia | H04N 13/15<br>348/43 |
| 2014/0354796 | A1* | 12/2014 | Hein | G02B 21/086<br>348/79 |
| 2015/0153559 | A1* | 6/2015 | Sato | G02B 21/367<br>348/79 |
| 2016/0291302 | A1* | 10/2016 | Schnitzler | G02B 21/367 |
| 2017/0172662 | A1* | 6/2017 | Panescu | A61B 90/37 |

* cited by examiner

MICROSCOPE SYSTEM AND METHOD FOR AUTOMATED ALIGNMENT OF A MICROSCOPE

The present invention relates to a method for the automated alignment of a microscope in view of the visibility of the base of a deep channel. Additionally, the invention relates to a microscope system for carrying out the method.

Observing the base of a deep channel in an observation object is of importance in materials testing and in medicine. By way of example, a situation that may occur in operations with the aid of operating microscopes is that the operating site is situated at the base of a deep channel. By way of example, deep tumors or aneurysms are attempted to be reached by a narrow, deep channel in neurosurgery in order to affect the surrounding tissue as little as possible during the operation. Another example for deep operating channels is found in ophthalmology, where the iris acts as a stop and the path between the iris and retina in the case of an operating site lying on the retina may likewise be considered to be a deep operating channel.

However, a deep operating channel harbors challenges in view of the observation of the base of the deep operating channel, which constitutes the actual operating site. Observing the base of a deep operating channel requires both an exact alignment of the observer beam path of the operating microscope and a sufficient illumination of the base of the deep operating channel once the operating microscope is aligned. In order to achieve the latter, e.g. US 2004/0057108 A1 or U.S. Pat. No. 4,783,159 propose bringing the optical axis of the illumination beam path as close as possible to the observer beam path. U.S. Pat. No. 5,446,582 moreover describes an operating microscope, in which an illumination beam path is aligned at least partly coaxially with an observation beam path leading to a camera. However, the difficulties of needing to precisely align the observer beam path in order to be able to observe a sufficient portion of the base of a deep operating channel and of sufficiently illuminating said portion remain.

Operating microscopes are generally embodied as stereo microscopes in which the observer beam path in each case comprises a first and a second stereoscopic partial beam path (for the right eye and for the left eye), wherein the stereoscopic partial beam paths are separated geometrically from one another such that the pupils thereof do not overlap. Moreover, many operating microscopes also comprise a co-observer beam path for a second observer, which is generally also embodied as a stereoscopic beam path, i.e. it comprises a first stereoscopic co-observer partial beam path and a second stereoscopic co-observer partial beam path. Although the stereoscopic partial beam paths for the co-observer can be decoupled from the stereoscopic partial beam paths for the main observer, the decoupling of the stereoscopic partial beam paths for the co-observer from the stereoscopic partial beam paths for the main observer leads to only some of the maximum possible light intensity of the respective observer beam path being available for both the main observer and the co-observer. Therefore, the stereoscopic co-observer partial beam paths are often separated geometrically from the stereoscopic main observer partial beam paths, i.e. the stereoscopic co-observer partial beam paths are not decoupled from the stereoscopic main observer partial beam paths but rather guided in such a way that the pupils of the stereoscopic main observer partial beam paths and of the stereoscopic co-observer partial beam paths do not overlap. As a result of this, modern operating microscopes often do not only have two geometrically separated stereoscopic partial beam paths available for the main observer but they often even have four geometrically separated stereoscopic observer beam paths (two for the main observer and two for the co-observer).

For the purposes of observing the base of a deep operating channel, the operating microscope must be aligned in such a way that beams emanating from a region of the base of the deep operating channel, which is as large as possible, can reach the observer beam path of the operating microscope without being blocked by the wall of the deep operating channel. Here, the alignment of the operating microscope becomes ever more difficult as the number of observer partial beam paths increases since the partial beams reaching the respective stereoscopic partial beam path extend in different, non-overlapping solid angle regions if the pupils of the stereoscopic partial beam paths do not overlap. On the basis of the sketch of the profile of stereoscopic partial beam paths in a microscope with a stereoscopic main observer beam path 301 and a stereoscopic co-observer beam path 303, FIG. 12 elucidates the problem of observing bases 4 of deep channels in observation objects 3. Therefore, a manual alignment of an operating microscope, for example in such a way that the base 4 of a deep operating channel is ideally visible both in the right-hand and left-hand stereoscopic partial beam path of an observer beam path or in such a way that the base 4 of a deep operating channel is ideally visible in the stereoscopic partial beam paths of a main observer beam path 301 and a co-observer beam path 303, is difficult and time-consuming.

Similar problems when observing the base of deep channels may also occur within the scope of materials testing with the aid of microscopes.

In light of the described prior art, an object of the present invention consists of providing a method for automated alignment of a microscope in view of the visibility of the base of a deep channel. A second object of the present invention consists of developing a microscope system, by means of which the method according to the invention can be carried out.

The first object is achieved by a method for automated alignment of a microscope in view of the visibility of the base of a deep channel according to claim 1; the second object is achieved by a microscope system according to claim 20. The dependent claims contain advantageous configurations of the invention.

What is made available according to the invention is a method for automated alignment of a microscope, for example an operating microscope, which is fastened to a motor-driven mount and/or a motor-driven stand and which has an observer beam path, in view of the visibility of the base of a deep channel in an observation object, for example a deep operating channel. Therein,

- at least one electronic image is obtained from the observation beam path,
- the focal depth is registered,
- the image portion constituting the base of the deep channel in the electronic image is established in the at least one electronic image on the basis of the registered focal depth and information about the position of the base in the deep channel,
- such an alignment of the microscope, i.e. such a position and/or orientation of the microscope, is established on the basis of the established image portion that the image portion constituting the base of the deep channel is maximized in the electronic image, and
- the established alignment of the microscope, i.e. the established position of the microscope and/or the established orientation of the microscope, is set with the aid of the motor-driven mount.

With the aid of the method according to the invention, a possibly long-winded manual alignment of the microscope in view of a visibility of the base of a deep channel which is as good as possible can be dispensed with. There are a number of approaches to establish the information about the position of the base in the deep channel, of which one is e.g. establishing the topography of the observation object. Another approach is based on the relatively shallow depth of field of optical microscope systems.

The method according to the invention is also suitable, in particular, for microscopes, in which the observer beam path comprises a first stereoscopic partial beam path and a second stereoscopic partial beam path. In this case, a first electronic stereoscopic partial image is obtained from the first stereoscopic partial beam path and a second electronic stereoscopic partial image is obtained from the second stereoscopic partial beam path. Then, the first image portion constituting the base of the deep channel in the first electronic stereoscopic partial image is established in the first electronic stereoscopic partial image on the basis of the registered focal depth and the information about the position of the base in the deep channel. Accordingly, the second image portion constituting the base of the deep channel in the second electronic stereoscopic partial image is established in the second electronic stereoscopic partial image on the basis of the registered focal depth and the information about the position of the base in the deep channel. Then, such an alignment of the microscope which maximizes the first image portion, which constitutes the base of the deep channel in the first electronic stereoscopic partial image, in the first electronic stereoscopic partial image and which maximizes the second image portion, which constitutes the base of the deep channel in the second electronic stereoscopic partial image, in the second electronic stereoscopic partial image is established with the aid of an image processing unit on the basis of the first image portion and the second image portion. Then, the established alignment, i.e. the established position of the microscope and/or the established orientation of the microscope, is set with the aid of the motor-driven mount. In this way, the visibility of the base can be maximized in both stereoscopic partial beam paths. In certain cases, for example in the case of very narrow operating channels, it may be advantageous or necessary for a maximum portion of the base of the deep channel only to be displayed in one of the two stereoscopic partial beam paths. In this case, the method according to the invention is only carried out on one stereoscopic partial beam path. In this case, it is advantageous if the stereoscopic partial beam path, in which the method according to the invention is carried out, is selectable because e.g. a treating medical practitioner is then able to set the visibility of the base of a deep operating channel for his preferred eye.

If the visible region of the base of a deep channel is intended to be maximized for a first and a second stereoscopic partial beam path of an observer beam path, this can be carried out e.g. by virtue of the image processing unit establishing the magnitude and the direction of the offset of the second image portion constituting the base of the deep channel in the second electronic stereoscopic partial image in relation to the first image portion constituting the base of the deep channel in the first electronic stereoscopic partial image and outputting such control signals to the mount that, for the purposes of aligning the microscope, the motor-driven mount and/or the motor-driven stand (101) move the microscope along the line of the offset until the magnitude of the offset is minimized in the first electronic stereoscopic partial image and in the second electronic stereoscopic partial image and, subsequently, the microscope is moved in a direction perpendicular to the line of the offset until a maximum of visible base of the deep channel is depicted in the first electronic stereoscopic partial image and in the second electronic stereoscopic partial image.

In an alternative procedure, a transformation, which minimizes a distance measure between a scene depicted in the second electronic stereoscopic partial image and a scene depicted in the first electronic stereoscopic partial image, is established. The transformation, which can be found e.g. by means of a variational method, can be restricted, in particular, to a so-called rigid transformation, which merely contains translations and rotations and is therefore also referred to as a rigid transformation. The process of minimizing the distance measure by means of a rigid transformation is referred to as a rigid registration. The ideal alignment of the microscope is then established from the established transformation in such a way that the image portion constituting the base of the deep channel is respectively maximized in the first electronic stereoscopic partial image and in the second electronic stereoscopic partial image.

In one procedure of the method according to the invention, the relatively shallow depth of field of optical microscope systems is used to establish the information about the position of the base in the deep channel. In this procedure, which can also be used if no stereoscopic partial beam paths are present or if only the visible region of the base of a deep channel is intended to be maximized in one of two stereoscopic partial beam paths, the information about the position of the base of the deep channel is obtained by virtue of the region in focus in the electronic image being identified with the area situated at the selected focal depth. In other words, the information about the position of the base is that the base is situated at the set focal depth. In the process, the microscope is preliminarily aligned in such a way that the base of the deep channel is at the selected focal depth, i.e. depicted in focus in the electronic image. The portion of the area in the image area depicted in focus is then established for the electronic image using the preliminarily aligned microscope. The alignment and the establishment of the portion of the area in the image area depicted in focus is continued iteratively until the portion of the area in the image area depicted in focus is at a maximum in the electronic image. This procedure is suitable, for example, when a user of the microscope system has optimized the image sharpness at the desired focal depth. What is used then is that the image sharpness at the edges of the channel is reduced strongly due to a shallow depth of field of the optical system of the observer beam path. If the visible region of the base of a deep channel is intended to be maximized both in the first and the second stereoscopic partial beam path of a stereoscopic observer beam path, the microscope is aligned preliminarily and the aligned microscope is used to establish the portion of the area in the image area respectively depicted in focus for the first and the second electronic stereoscopic partial image. The alignment and establishment of the portion of the area in the image area depicted in focus is then carried out iteratively until the portion of the area in the image area depicted in focus is respectively at a maximum in the first electronic stereoscopic partial image and the second electronic stereoscopic partial image.

The topography of the observation object with the deep channel is established in another approach for establishing information about the position of the base in the deep channel. The information about the position of the base of the deep channel is then established with the aid of the established topography of the observation object. Here, in particular, the information about the position of the base in the deep channel can be the position of the base in relation to the microscope in a predetermined coordinate system, for example a coordinate system linked with the microscope. Moreover, a surface normal averaged over the base of the deep channel can be established from the established topography. This renders it possible during the alignment of the microscope to orient the optical axis of the microscope in such a way that it extends parallel to the averaged surface normal. If a trocar sleeve with a longitudinal axis is used to keep a deep operating channel open, the optical axis of the operating microscope can also be oriented in such a way when aligning an operating microscope that it extends parallel to the longitudinal axis of the trocar sleeve. In this way, the orientation of the operating microscope can be adapted in an ideal manner to the extent of the deep operating channel provided with the trocar sleeve. It is then not necessary to average the surface normals over the base of the deep channel. In general, a trocar sleeve will be a cylinder. Therefore, what is known is that the axis extends perpendicular to the end faces of the cylinder, but the orientation thereof in space is unknown. Aligning the optical axis of the operating microscope parallel to the trocar axis, in particular coaxially with the trocar axis, can be carried out, for example, by virtue of the region of the inner lateral surface of the trocar sleeve visible in the image being determined on the basis of the image of the trocar sleeve obtained by the operating microscope and by virtue of the region of the inner lateral surface of the trocar sleeve visible in the image being minimized by adapting the alignment of the operating microscope. The optical axis of the microscope extends along the optical axis of the trocar sleeve when the visible inner lateral surface is minimized. Alternatively, it is also possible to store a 3D model of the trocar in the system such that only the plan view (2D or 3D) on the cylinder is required. With knowledge about the model and the plan view, the position of the trocar is known, as is consequently also the orientation of the longitudinal axis to which the operating microscope needs to be aligned. In this case, the optical axis of the operating microscope can be aligned parallel to the longitudinal axis of the trocar sleeve by virtue of the orientation of the longitudinal axis of the trocar sleeve being established from an image of the trocar sleeve obtained by the operating microscope with the aid of a stored 3D model of the trocar sleeve and by virtue of the operating microscope subsequently being aligned parallel to the established longitudinal axis.

In order to establish the topography of the observation object with the deep channel, it is possible, within the scope of the method according to the invention, to obtain a first electronic stereoscopic partial image from the first stereoscopic partial beam path and a second electronic stereoscopic partial image from the second stereoscopic partial beam path. By way of example, the topography of the observation object can then be established from the first electronic stereoscopic partial image and the second electronic stereoscopic partial image by means of triangulation. However, if the image portions in the stereoscopic partial images are too different, it may be the case that it is not possible to create correspondences for establishing deformation and/or depth maps for the whole stereoscopic image. However, the lacking correspondences also offer an approach for maximizing the image portions depicting the base (4) of the deep channel in the electronic stereoscopic partial images (210A, 210B), i.e. for ideally aligning the microscope. To this end, the microscope is aligned preliminarily. Then, in the case of a preliminarily aligned microscope, the lacking correspondences for the deformation and/or depth maps at the set focal depth are established for the first electronic stereoscopic partial image and the second stereoscopic partial image within the scope of establishing the topography. The alignment and establishment of the lacking correspondences is then carried out iteratively until the lacking correspondences are minimized. Then, the visible regions of the base of the deep channel are maximized in the stereoscopic partial images.

Instead of using two stereoscopic partial images, the topography of the observation object can also be established by virtue of the channel being scanned by a confocal sensor. In this case, the confocal sensor is preferably a chromatically encoded confocal sensor since the depth information is then encoded into the spectrum of the received light and hence there is no need for scanning in the longitudinal direction.

A further alternative for establishing the topography of the observation object consists of illuminating the observation object with a laser pulse, as a result of which reflection pulses are generated from the laser light reflected by the observation object. The reflection pulses are then detected by a detector and the topography is established from the difference between the time of the emission of the laser pulse and the arrival time of the reflection pulses at the detector. This method, which is known as a so-called time-of-flight (TOF) method, can be carried out in a scanning manner, i.e. the surface of the observation object is scanned by laser pulses and there is a detection of the arrival time of the corresponding reflection pulse in each scanning step, or it can be carried out in an imaging manner, i.e. the surface of the observation object is illuminated by a laser pulse and the reflection pulses reflected by individual regions of the surface are imaged on a detector field. Then, the arrival time of the reflection pulse at the respective detector is established for each detector of the detector field. In this case, the detector can be a so-called TOF camera.

A further alternative for establishing the topography of the observation object consists of illuminating the observation object with a structured light pattern and establishing the topography of the observation object from the profile of the structure in the at least one electronic image of the observation object.

A further alternative for establishing the topography of the observation object consists of establishing the topography by means of optical coherence tomography (OCT).

If the microscope is a microscope which comprises a main observer beam path, in particular a main observer beam path with a first and a second stereoscopic main observer partial beam path, and a co-observer beam path, in particular a co-observer beam path with a first and a second stereoscopic co-observer partial beam path, the microscope can initially be aligned in a development of the method according to the invention in such a way that the region of the base of the deep channel visible with the main observer beam path of the microscope is maximized before the alignment of the microscope is varied under the constraint that the region of the deep channel visible with the main observer beam path of the microscope remains maximal for the main observer beam path in such a way that the region of the base of the deep channel visible with the co-observer beam path of the microscope becomes maximal while observing the constraint. This embodiment of the method is advantageous, particularly when aligning operating microscopes, since these often also have a co-observer beam path in addition to a main observer beam path.

Moreover, the illumination of the base of the deep channel can also be optimized in the method according to the invention.

A microscope system according to the invention comprises:

a microscope with an observation beam path with at least one camera for obtaining at least one electronic image of an observation object with a deep channel, a motor-driven mount and/or a motor-driven stand, on which the microscope is mounted, a detection unit for detecting the focal depth, an image processing unit connected to the detection unit for receiving the detected focal depth and connected to the at least one camera for receiving the at least one electronic image, which image processing unit establishes the image portion in the at least one electronic image constituting the base of the deep channel in the at least one electronic image on the basis of information about the position of the base of the deep channel and the received focal depth and which image processing unit establishes such an alignment of the microscope that a maximal portion of the base of the deep channel is visible in the at least one electronic image, and a control unit connected to the image processing unit for receiving the established alignment and connected to the motor-driven mount and/or the motor-driven stand for outputting control signals, which control unit generates control signals which cause the motor-driven mount and/or the motor-driven stand to correspondingly align the microscope on the basis of the established alignment.

The method according to the invention can be carried out by the microscope system according to the invention which, in particular, can be configured as an operating microscope system. Therefore, the properties and advantages of the invention described in relation to the method according to the invention are also realized by the microscope system according to the invention.

In particular, the microscope system according to the invention can comprise a microscope, in which the observer beam path comprises a first stereoscopic partial beam path and a second stereoscopic partial beam path. Then, a first electronic stereoscopic partial image is obtained from the first stereoscopic partial beam path. Correspondingly, a second electronic stereoscopic partial image is obtained from the second stereoscopic partial beam path. The image processing unit then establishes the first image portion, which constitutes the base of the deep channel in the first stereoscopic partial image, in the first electronic stereoscopic partial image on the basis of the information about the position of the base in the deep channel and the received focal depth. Accordingly, the image processing unit then establishes the second image portion, which constitutes the base of the deep channel in the second electronic stereoscopic partial image, in the second electronic stereoscopic partial image on the basis of the information about the position of the base in the deep channel and the received focal depth. On the basis of the first image portion and the second image portion, the image processing unit then establishes such an alignment of the microscope that a maximum portion of the base of the deep channel is visible both in the first electronic stereoscopic partial image and in the second electronic stereoscopic partial image. This embodiment of the microscope system renders it possible to maximize the visibility of the base in both stereoscopic partial beam paths.

Moreover, the observer beam path can comprise a main observer beam path with at least one camera, in particular a main observer beam path with a first and a second stereoscopic main observer partial beam path and respectively one camera in both partial beam paths, and a co-observer beam path with at least one camera, in particular a co-observer beam path with a first and a second stereoscopic co-observer partial beam path and at least one camera for recording an image in the partial beam paths in each case, in the microscope system according to the invention, in particular if the latter is embodied as an operating microscope system. In particular, use can be made of an HD camera as well, on the chip of which the two partial images are imaged next to one another. The image processing unit can then be configured initially to align the microscope in such a way that the region of the base of the deep channel visible with the main observer beam path is maximal before it varies the alignment of the microscope under the constraint that the region of the deep channel visible with the main observer beam path remains maximal until the region of the base of the deep channel visible with the co-observer beam path is maximal. As a result, the visibility of the base of the deep channel in the co-observer beam path can be maximized to the greatest possible extent, without, in the process, reducing the visibility of the base in the main observer beam path.

The microscope system according to the invention can moreover comprise a topography unit for establishing the topography of the observation object with the deep channel.

The visibility of the base of the deep channel in the observation beam path increases with improved illumination of the base. Therefore, in a development of the microscope system according to the invention, the latter also comprises an illumination unit and an optimization apparatus for optimizing the illumination of the base of the deep channel.

Further features, properties and advantages of the present invention will become apparent from the following description of exemplary embodiments with reference to the accompanying figures.

Figure 11:
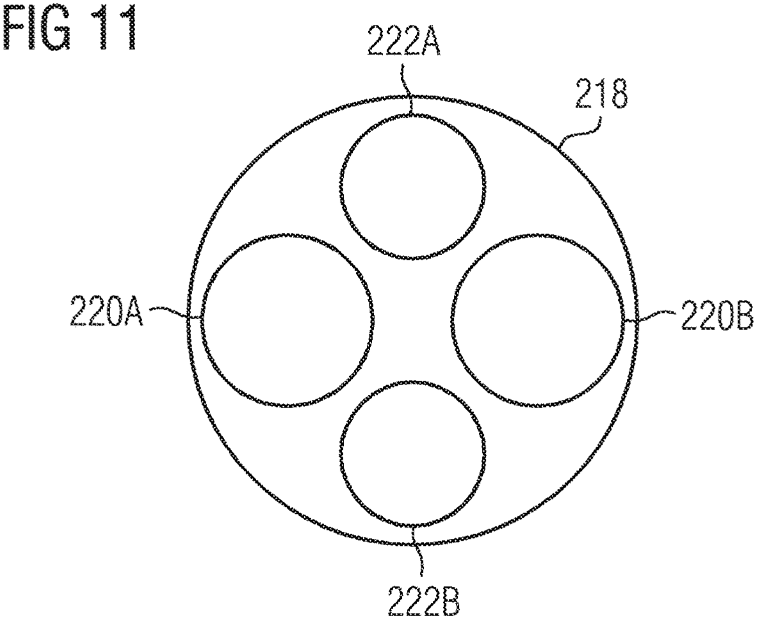

FIG. 11 schematically shows the pupils for a configuration of an operating microscope with a main observer beam path and a co-observer beam path.

Figure 12:
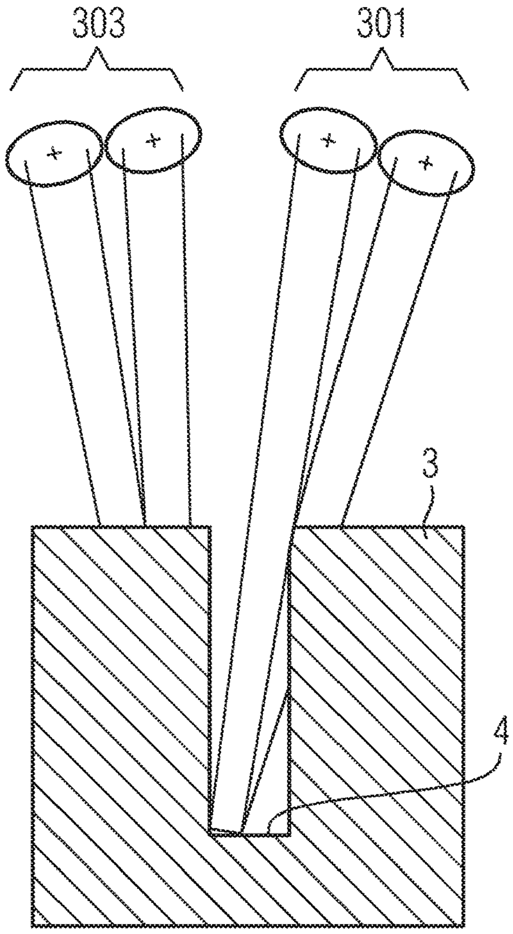

FIG. 12 shows a sketch which elucidates the problem of observing bases of deep channels.

Figure 1:
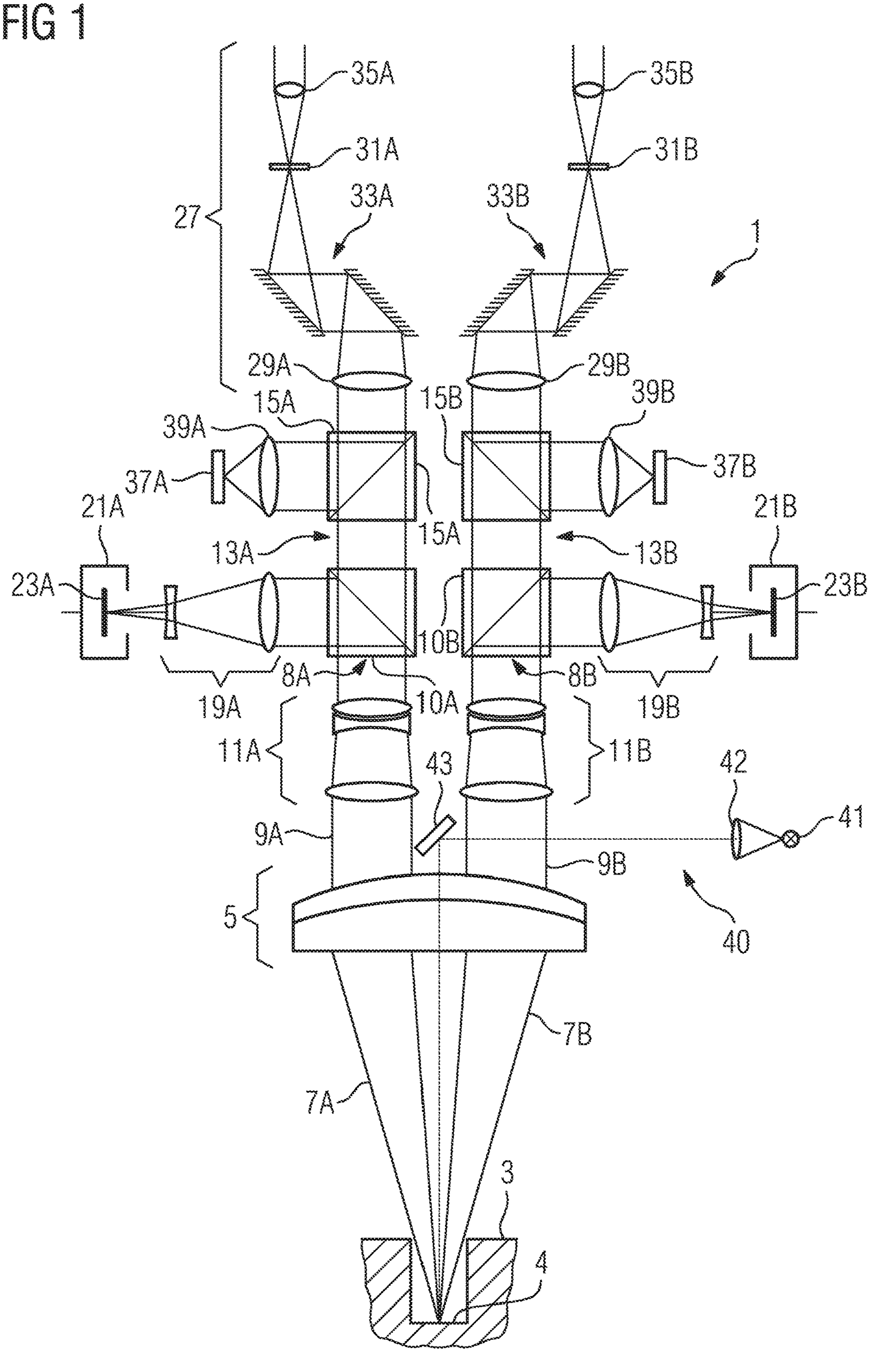
FIG. 1 shows an example of an operating microscope, as can be used within the scope of a microscope system according to the invention.

Below, an example for an operating microscope and an example for a stand, as can be used in the microscope system according to the invention, are described with reference to FIGS. 1 to 3, before the description turns to examples for operating microscope systems embodied according to the invention and methods for the automated alignment of microscopes using the example of aligning operating microscopes.

The operating microscope 1 comprises an objective 5, which is to be directed toward an object field 3 in an observation object and which, in the present example, is illustrated as an achromatic lens constructed from at least two partial lenses cemented to one another. The object field, in this case the base 4 of a deep operating channel, is arranged in the focal plane of the objective 5, such that it is imaged to infinity, that is to say that a divergent beam 7 emerging from the base 4 is converted into a parallel beam 9 upon passing through the objective 5.

Instead of just one achromatic lens, as is used as the objective 5 in the present example, it is also possible to use an objective lens system comprising a plurality of individual lenses, for instance a so-called varifocal objective, which can be used to vary the back focus of the operating microscope 1, i.e. the distance between the focal plane and the objective 5. By varying the back focus, it is possible to adapt an operating microscope 1 with varifocal objective to different working distances, without the position of the operating microscope 1 itself needing to be altered. In such a varifocal system, too, the object field 4 arranged in the focal plane is imaged to infinity, such that a parallel beam is present on the observer side in the case of a varifocal objective, too.

A magnifying apparatus 11A, 11B is arranged on the observer side of the objective 5, which magnifying apparatus can be embodied either as a zoom system for changing the magnification factor in a continuously variable manner as in the example illustrated, or as a so-called Galilean changer for changing the magnification factor in a stepwise manner. In a zoom system, illustrated by way of example as a lens combination having three lenses, the two object-side lenses can be displaced in order to vary the magnification factor. In actual fact, however, the zoom system can also have more than three lenses, for example four or more lenses, in which case both outer lenses can then be arranged in a fixed manner. In a Galilean changer, by contrast, there are a plurality of fixed lens combinations which represent different magnification factors and which can be introduced into the beam path alternately. Both a zoom system and a Galilean changer convert an object-side parallel beam into an observer-side parallel beam having a different beam diameter. In this case, the magnifying apparatus 11A, 11B is often already part of the binocular beam path of the operating microscope 1, that is to say it has a dedicated lens combination for each stereoscopic observation partial beam path of the operating microscope 1.

Adjacent to the magnifying apparatus 11A, 11B on the observer side there is an output coupling arrangement 8A, 8B having beam splitter prisms 10A, 10B, with the aid of which, from each stereoscopic partial beam 9A, 9B, a part is respectively coupled out and forwarded to a camera 21A, 21B having a digital image sensor 23A, 23B, said camera being connected to the corresponding partial beam path of the operating microscope 1. The cameras 21A, 21B, which are coupled to the output coupling arrangement 8A, 8B with the interposition of camera adapters 19A, 19B, which effect a focal length adaptation, are connected to an image processing unit 50 (see FIGS. 4 and 7), to which digital images generated by means of the image sensors 23A, 23B are output.

In the present exemplary embodiment, the operating microscope 1 additionally comprises displays 37A, 37B, on which superimposition images for superimposition into the observation partial beam paths can be represented. Each display 37A, 37B is assigned a superimposition optical unit 39A, 39B and a beam splitter prism 15A, 15B of an input coupling arrangement 13A, 13B, with the aid of which a beam emerging from a display 37A, 37B and representing a superimposition image can be superimposed on the corresponding stereoscopic partial beam 9A, 9B in that part of the observation beam path of the operating microscope 1 which leads to a binocular tube 27.

The binocular tube 27, which is adjacent to the input coupling arrangement 13A, 13B on the observer side, has two tube objectives 29A, 29B, which focus the respective parallel beam 9A, 9B onto an intermediate image plane 31A, 31B, that is to say image the observation object 3 onto the respective intermediate image plane 31A, 31B. The intermediate images situated in the intermediate image planes 31A, 31B are finally imaged in turn to infinity by eyepiece lenses 35A, 35B, such that a surgeon can observe the intermediate image with a relaxed eye. Moreover, a magnification of the distance between the two partial beams 9A, 9B is carried out in the binocular tube by means of a mirror system or by means of prisms 33A, 33B in order to adapt said distance to the intraocular distance of the observer. In addition, image erection is carried out by the mirror system or the prisms 33A, 33B.

The operating microscope 1 is also equipped with an illumination device 40, by means of which the object field 4 can be illuminated with illumination light. For this purpose, the illumination device has a light source 41, for instance a halogen incandescent lamp, a gas discharge lamp, one or more LEDs, etc. The light source 41 can be arranged directly at the operating microscope 1 or in a manner remote from the operating microscope 1, for instance at the microscope stand. In the case of a remote arrangement, the light from the light source 41 is guided to the operating microscope 1 by means of an optical waveguide.

The light originating from the light source 41 is directed in the direction of the object field 4 via a deflection mirror 43. In the operating microscope 1 shown in FIG. 1, the illumination beam path is embodied as a so-called 0° illumination. In the case of such illumination, the illumination beam path is coupled into the main objective 5 in the direction of the object field 4 by means of the deflection mirror 43 between the two partial beam paths 9A, 9B, through the objective 5 along the optical axis of the objective 5—or at an angle of less than 6° with respect to the optical axis of the objective 5. As a result of the small angle with respect to the optical axis of the main objective 5, the illumination light can reach an object field situated at the base 4 of the deep operating channel, even through a narrow operating channel. Additionally or alternatively, an illumination beam path which enables a so-called coaxial illumination can also be present. In coaxial illumination, a first illumination partial beam path and a second illumination partial beam path are present, which are coupled into the operating microscope 1 via one or a plurality of beam splitters coaxially or at a small angle (less than 6°) with respect to the optical axes of the observation partial beam paths, that is to say coaxially with the stereoscopic partial beams 9A, 9B. Like in the case of the 0° illumination, the illumination light can reach an object field situated at the base 4 of the deep operating channel through a narrow operating channel in the case of the coaxial illumination as well.

In addition, an illumination beam path embodied as so-called oblique illumination can also be realized in the operating microscope 1. In such oblique illumination, the beam path runs at a relatively large angle (6° or more) with respect to the optical axis of the objective 5 and can run completely outside the objective 5. Alternatively, however, there is also the possibility of allowing the illumination beam path of the oblique illumination to run through a marginal region of the objective 5. By way of example, the observation object 3 in the surroundings of the operating site (which is given by the base 4 of the deep operating channel) can be illuminated by way of the oblique illumination.

The operating microscope 1 is fastened to a motor-driven stand. Below, the stand 101 and the degrees of freedom made available by the stand 101 for the movement of the operating microscope 1 are explained in more detail on the basis of FIGS. 2 and 3.

Figure 2:
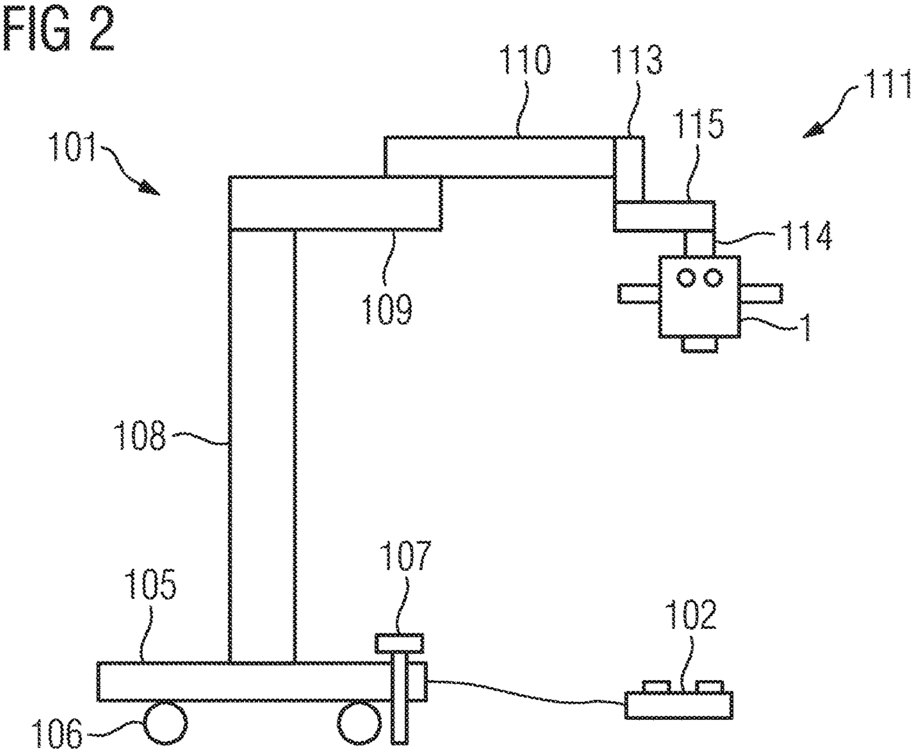
FIG. 2 shows an example of a stand, as can be used within the scope of a microscope system according to the invention.

In the example of a stand 101 shown in FIG. 2, the stand rests on a stand foot 105 which has rollers 106 on the lower side thereof, said rollers enabling a displacement of the stand 101. In order to prevent an unwanted displacement of the stand 101, the stand foot 105 moreover comprises a foot brake 107.

As stand members, the actual stand 101 comprises a height-adjustable stand column 108, a support arm 109, a spring arm 110 and a microscope mount 111, which in turn comprises a connection element 113, a swivel arm 115 and a holding arm 114. The degrees of freedom provided by the stand members for positioning the operating microscope 1 are shown in FIG. 3. At one end, the support arm 109 is connected to the stand column 108 in a manner rotatable about an axis A. At the other end of the support arm 109, one end of the spring arm 110 is fastened in a manner rotatable about an axis B that is parallel to the axis A such that the support arm 109 and the spring arm 110 form an articulated arm. The other end of the spring arm 110 is formed by a tilt mechanism (not depicted here), on which the microscope mount 111 is fastened and which enables a tilting of the microscope mount 111 about the axis C.

The microscope mount 111 has an axis of rotation D, a swivel axis E and a tilt axis F, about which the microscope 1 can be rotated, swiveled and tilted, respectively. Using a connection element 113, the microscope mount 111 is fastened at the outer end of the spring arm 110 in a manner rotatable about the axis of rotation D. The axis of rotation D extends along the connection element 113. The connection element 113 is adjoined by a swivel arm 115, with the aid of which a holding arm 114 attached to the swivel arm 115 can be swiveled about the swivel axis E. The swivel axis E extends through the swivel arm 115. The angle between the swivel arm 115 and the connection element 113, i.e. the angle between the swivel axis E and the axis of rotation D, can be varied by means of an adjustment mechanism arranged between the connection part 113 and the swivel arm 115. The tilt axis F, which enables tilting of the operating microscope 1, extends through the holding arm 114 in a manner perpendicular to the plane of the illustration. The operating microscope 1 is fastened to the holding arm 114 by means of a microscope holder (not depicted here).

The movement of the stand 101 and the mount 111 about the above-described axes is carried out in a motor-driven manner on the basis of control signals, which are output by a control unit to corresponding actuators in the stand 101 or in the holder 111.

Below, an operating microscope system embodied according to the invention is described with reference to FIG. 4. The operating microscope system comprises an operating microscope 1, which has at least one observer beam path with a camera 21A, 21B for obtaining an electronic image, in particular of an observation object 3 with a deep operating channel. In the present exemplary embodiment, use is made of an operating microscope 1, as was described with reference to FIG. 1. Accordingly, the observer beam path is a stereoscopic observer beam path with a first and a second stereoscopic partial beam path. A beam is decoupled in the direction of a digital camera 21A, 21B, by means of which the respective stereoscopic partial image is recorded and converted into an electronic stereoscopic partial image, from each one of the two stereoscopic partial beam paths.

Figure 3:
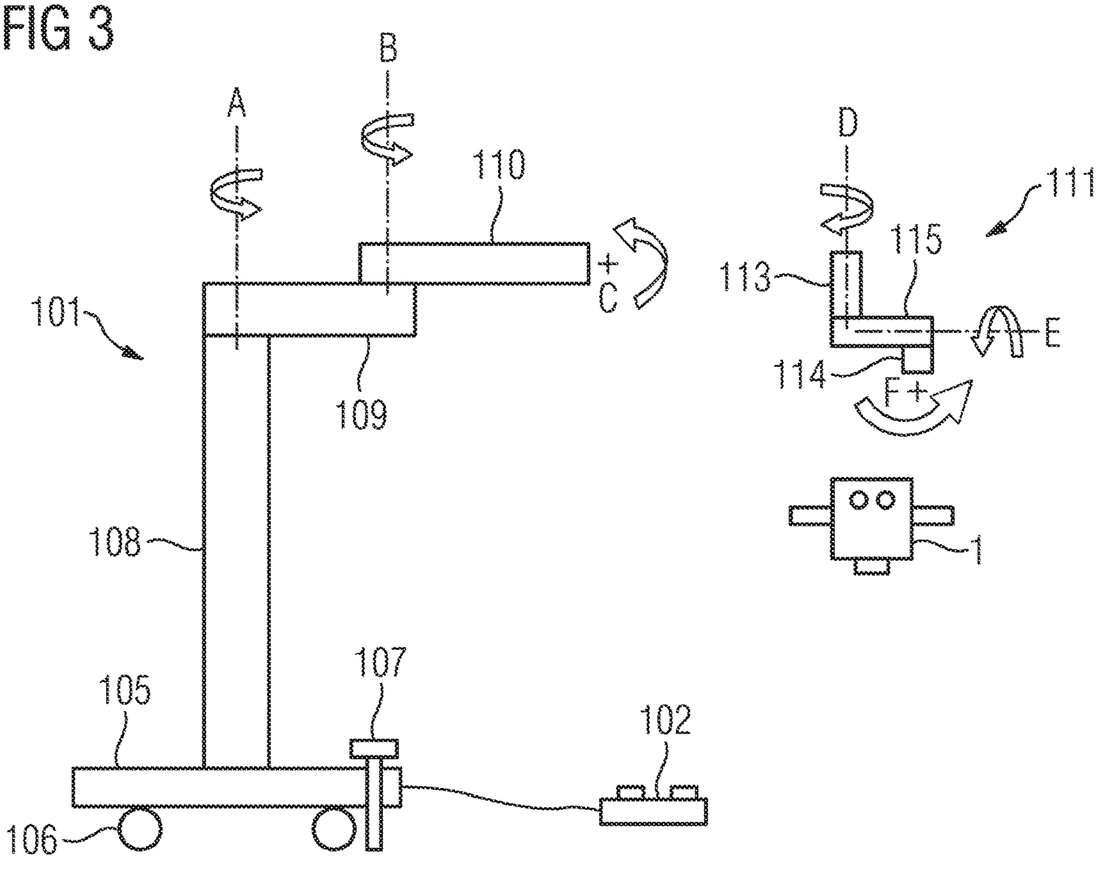
FIG. 3 shows the degrees of freedom which are made available by the stand from FIG. 2.

A motor-driven stand 101, as was described with reference to FIGS. 2 and 3, is used as a stand. The latter receives the control signals thereof from a control unit 201, which is connected to an image processing unit 203. In addition to being connected to the control unit 201, the image processing unit 203 is also connected to the cameras 21A, 21B for the purposes of receiving the electronic stereoscopic partial images. Moreover, the image processing unit 203 is connected to a processing unit 205 which establishes the position of the base 4 of the deep operating channel in the coordinate system of the operating microscope 1 on the basis of the topography of an observation object 3 with a deep operating channel, observed by the operating microscope 1, and the focal depth set at the operating microscope. The set focal depth of the operating microscope 1 is received by the processing unit 205 from a detection unit 207 of the operating microscope 1, which detects the set focal depth and outputs an electronic signal representing the detected focal depth. The processing unit 205 receives the topography of the observation object 3 in the form of electronic signals representing the topography from a topography unit 209 connected to the processing unit 205. In the present exemplary embodiment, the topography unit 209 is also connected to the cameras 21A, 21B of the operating microscope 1 for the purposes of receiving the electronic stereoscopic partial images, in addition to being connected to the processing unit 205.

Figure 4:
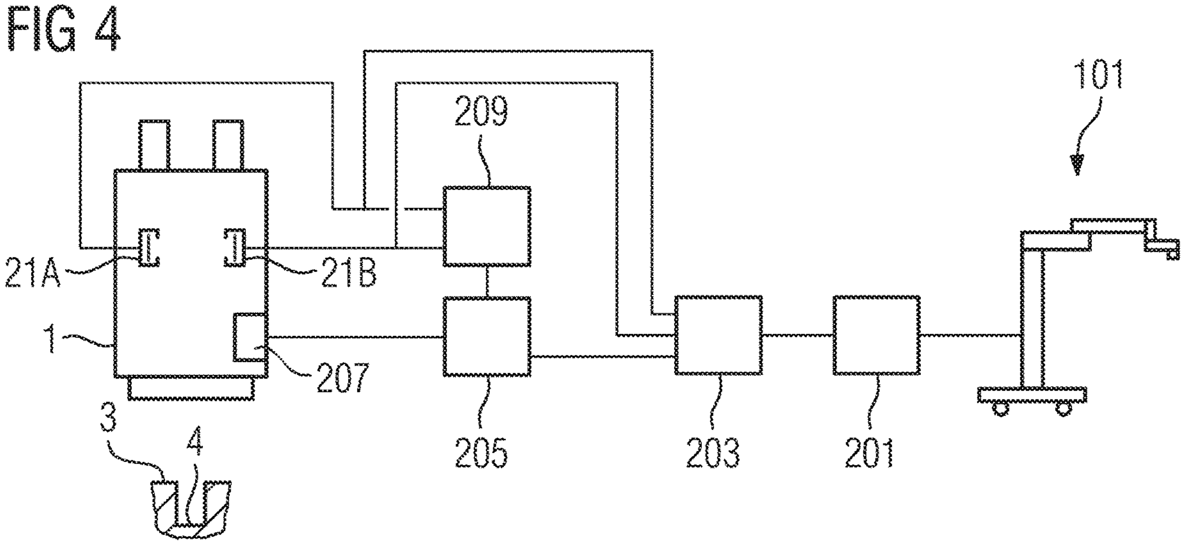
FIG. 4 shows a first exemplary embodiment of an operating microscope system embodied according to the invention.
Figure 5:
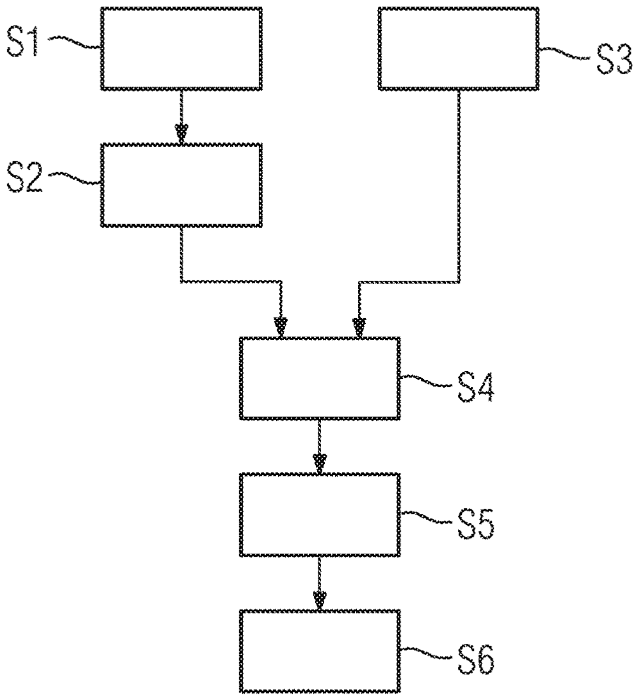
FIG. 5 shows a first exemplary embodiment for the method according to the invention on the basis of a flowchart.

Using the operating microscope system shown in FIG. 4, an automatic alignment of the operating microscope 1 in view of the visibility of the base 4 of the deep operating channel is possible. How this alignment is carried out is described with reference to FIG. 5 on the basis of a first exemplary embodiment for the automated alignment of the operating microscope. Here, FIG. 5 shows a flowchart which represents the individual steps when aligning the operating microscope 1. In a first step S1, electronic stereoscopic partial images of the observation object 3, which are then output to the topography unit 209 and the image processing unit 203, are obtained with the aid of the cameras 21A, 21B of the operating microscope 1. The topography of the observation object 3 in the coordinate system of the operating microscope 1 is established on the basis of the received electronic stereoscopic partial images in the topography unit 209 with the aid of a triangulation method. The established topography is forwarded to the processing unit 205 in the form of an electronic signal representing the topography. Parallel therewith, in step S3, the detection unit 207 detects the focal depth set in the operating microscope 1 and outputs an electronic signal representing the detected focal depth to the processing unit 205. Even though the steps of establishing the topography and of detecting the focal depth are carried out in parallel in the present exemplary embodiment of the method according to the invention, these steps can also be carried out sequentially.

In step S4, the processing unit 205 establishes the position of the base 4 of the deep operating channel in the electronic stereoscopic partial images on the basis of the signal received by the topography unit 209 and representing the topography of the observation object 3 and on the basis of the signal received by the detection unit 207 and representing the focal depth set at the operating microscope 1, and said processing unit outputs a signal representing the position of the base 4 of the deep operating channel. This signal is received by the image processing unit 203, which moreover receives the electronic stereoscopic partial images from the cameras 21A, 21B. The image processing unit 203 establishes such an alignment of the operating microscope 1, i.e. such a location and/or such an orientation of the operating microscope 1, on the basis of the position of the base 4 of the deep operating channel in the observation object 3 in the electronic stereoscopic partial images that the region of the base 4 of the deep operating channel visible in the stereoscopic partial images of the observer beam path is maximized (step S5). Subsequently, the image processing unit 203 outputs an electronic signal representing the established alignment of the operating microscope 1 to the control unit 201, which then aligns the operating microscope 1 in step S6 with the aid of the stand 101 in accordance with the signal received by the image processing unit 203.

Figure 6:
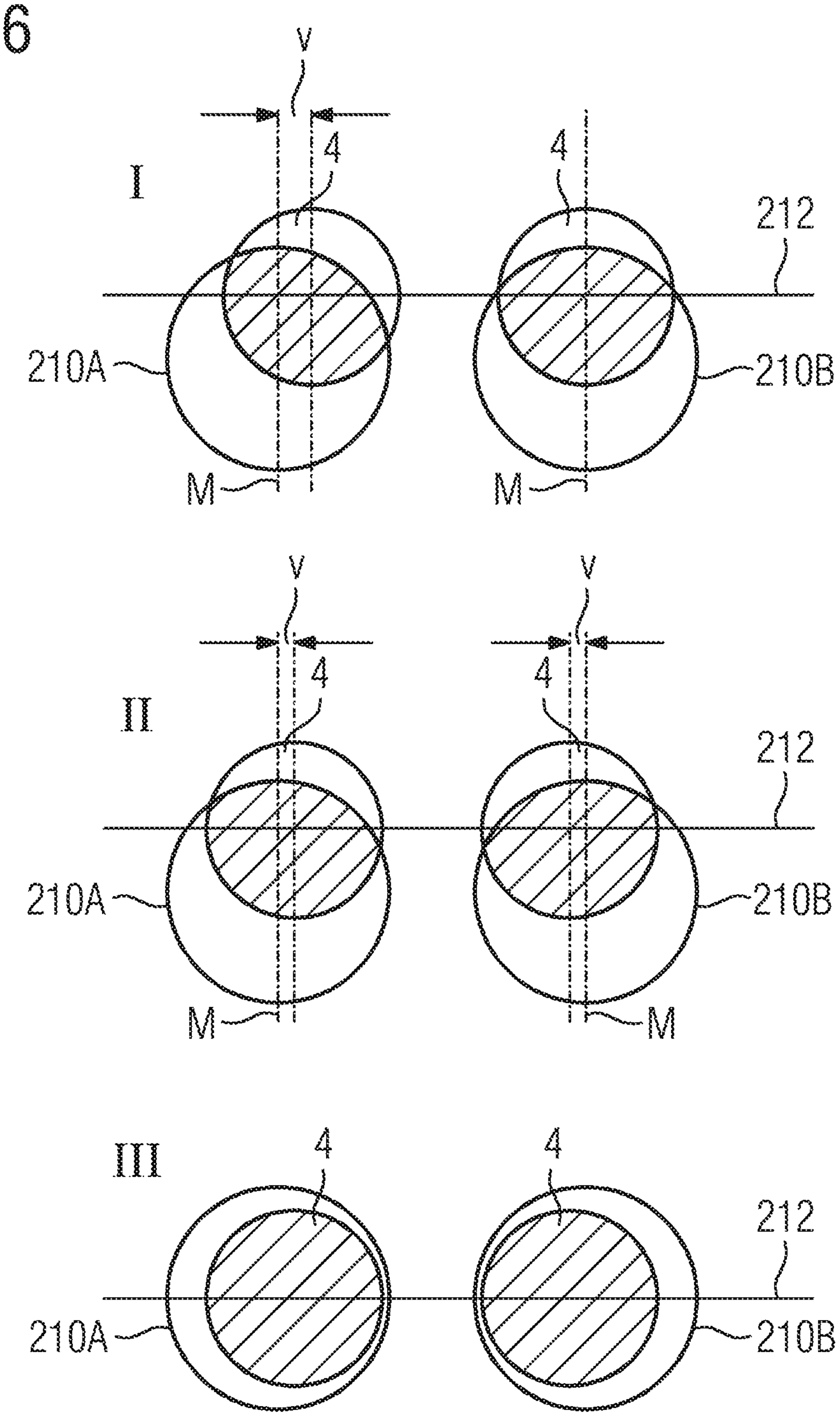
FIG. 6 shows a first example for aligning an operating microscope within the scope of the method depicted in FIG. 5.

A possible method for finding the ideal location and/or the ideal orientation of the operating microscope 1 is now described with reference to FIG. 6. FIG. 6 shows, in a very schematic illustration, the stereoscopic partial images 210A, 210B obtained by the observer beam path of the operating microscope 1 and the base 4 of the deep operating channel, as it can be seen in the stereoscopic partial images 210A. 210B after an approximate alignment of the operating microscope 1. Here, the figure shows the illustration of the base 4 in the stereoscopic partial images 210A, 210B during various stages of the alignment of the operating microscope 1, which are denoted by the Roman numerals I to III. The hatched area in each case shows the portion of the base 4 of the deep operating channel visible in the stereoscopic partial images 210A, 210B.

After a first approximate alignment of the operating microscope 1, portions of the base 4 of the deep operating channel can be seen in both the stereoscopic partial images 210A, 210B (section I of FIG. 6). However, the portions of the base 4 depicted in the stereoscopic partial images 210A, 210B have a different offset V from the central line M of the respective image along the line 212, and so the two portions in the stereoscopic partial images are different. In a first step of the alignment method, the image processing unit 203 now establishes the offset V of the portions of the base 4 in the stereoscopic partial images 210A, 210B and it establishes a displacement of the operating microscope 1 along the line 212 of the offset which leads to the offset V from the central line M of the respective image being the same in both images, i.e. the offset between the two partial images being minimized. The illustration of the base 4 of the deep operating channel in the stereoscopic partial images 210A, 210B after a corresponding displacement of the operating microscope 1 along the line of the offset 212 is depicted schematically in section II of FIG. 6. As depicted in section II, this displacement leads to an equally sized portion of the base 4 of the deep operating channel being visible in each case in the two stereoscopic partial images 210A, 210B.

Subsequently, the image processing unit 203 establishes a displacement of the operating microscope 1 perpendicular to the line 212 of the offset such that the portion of the base 4 of the deep operating channel visible in the stereoscopic partial images 210A, 210B is maximized. The illustration of the base 4 of the deep operating channel in the stereoscopic partial images 210A, 210B after a corresponding displacement of the operating microscope 1 is shown in section III of FIG. 6. The displacements parallel and perpendicular to the line 212 of the offset are output by the image processing unit 203 to the control unit 201 in the form of signals representing the displacement, which control unit then, on the basis of the received signals, outputs suitable control signals for the motor-driven stand 101, on the basis of which the stand 101 then aligns the operating microscope 1.

In the described method, it is possible, after the approximate alignment of the operating microscope 1, to initially calculate the displacements of the operating microscope 1 parallel and perpendicular to the line 212 of the offset between the portions of the base 4 of the deep operating channel depicted in the stereoscopic partial images 210A, 210B before the operating microscope 1 is aligned in a single alignment step. Alternatively, it is also possible to initially undertake an alignment of the operating microscope 1 representing the displacement parallel to the line 212 of the offset in a first alignment step, before the image processing unit 203 establishes the displacement perpendicular to the line 212 of the offset. Aligning the operating microscope 1 perpendicular to the line of the offset 212 is then carried out in a second alignment step. Moreover, it is possible to undertake the alignment parallel and perpendicular to the line 212 of the offset in small steps in each case and recalculate the further required displacement on the basis of stereoscopic partial images 210A, 210B newly recorded after each step. A feedback loop is created thus, by means of which the alignment of the operating microscope 1 can be monitored.

However, the procedure for aligning the operating microscope 1 described with reference to FIG. 6 is merely one from several possible procedures for aligning the operating microscope 1. By way of example, an alternative procedure consists of rigidly registering the two stereoscopic partial images. In the rigid registration of the stereoscopic partial images, a transformation which leads to the scenes depicted in the two stereoscopic partial images having a similarity with respect to one another that is as great as possible is established. Here, only translations and rotations are admissible in a rigid transformation, which find use in a rigid registration. In the present exemplary embodiment, rotations can be dispensed with in this case, since the scenes in the stereoscopic partial images are not twisted against one another. A distance measure, which penalizes differences between the scenes with a measure to be set, is defined to establish the transformation which leads to the greatest similarity between the scenes depicted in the two stereoscopic partial images. The distance measure between the two scenes is then minimized by means of a variational method. Within the scope of the variational method, parameters of the transformation, e.g. the length of the paths of two mutually perpendicular translations in the present exemplary embodiment, are varied until the parameter values, i.e. the path lengths, for which the distance measure is minimized are found. From the path lengths which were found for the minimum distance measure, the image processing unit 203 can then establish that displacement of the operating microscope 1 which is required to undertake the displacement of the stereoscopic partial images, required for minimizing the distance measure, relative to one another in reality.

If it is not only the location of the operating microscope 1 but also the orientation thereof that is intended to be optimized when aligning the operating microscope 1, there is the option of extending the method in such a way that a surface normal averaged over the whole base area 4 of the deep operating channel is calculated on the basis of the topology of the observation object 3 and the operating microscope 1 is then oriented parallel to the averaged surface normal.

A further method for maximizing the region of the base 4 of a deep operating channel visible in the stereoscopic partial images of the observer beam path consists of seeking for lacking correspondences between the scenes depicted in the stereoscopic partial images when establishing the topography of the observation object 3. Such lacking correspondences are created when the scenes in the two stereoscopic partial images are different. The number of lacking correspondences present increases with increasing size of the differences in the scenes. By way of example, the lacking correspondences can be minimized by iterative alignment of the operating microscope 1 which, as a consequence, leads to the region of the base 4 of the deep operating channel visible in the stereoscopic partial images being maximal.

Figure 7:
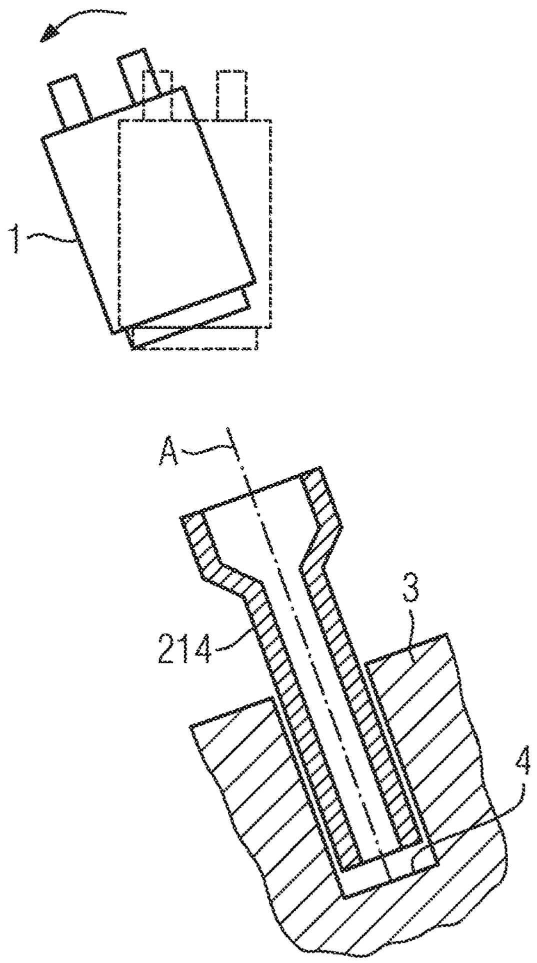
FIG. 7 shows a second example for aligning an operating microscope within the scope of the method according to the invention.

By way of example, if use is made of a trocar for keeping a deep operating channel open, the orientation of the operating microscope can also be aligned along the longitudinal axis A of the sleeve 214 of the trocar, as is depicted in FIG. 7, instead of being aligned along an averaged surface normal of the base 4 of the deep operating channel. The fact that the longitudinal axis A of the trocar sleeve 214 substantially corresponds to an averaged surface normal of the base 4 of the deep operating channel is used in this case.

A second exemplary embodiment of an operating microscope system according to the invention is described below with reference to FIG. 8. Elements of the second exemplary embodiment, which do not differ from elements of the first exemplary embodiment, are denoted in FIG. 8 with the same reference signs as the corresponding elements in FIG. 4 and are not explained again in order to avoid repetition.

Figure 8:
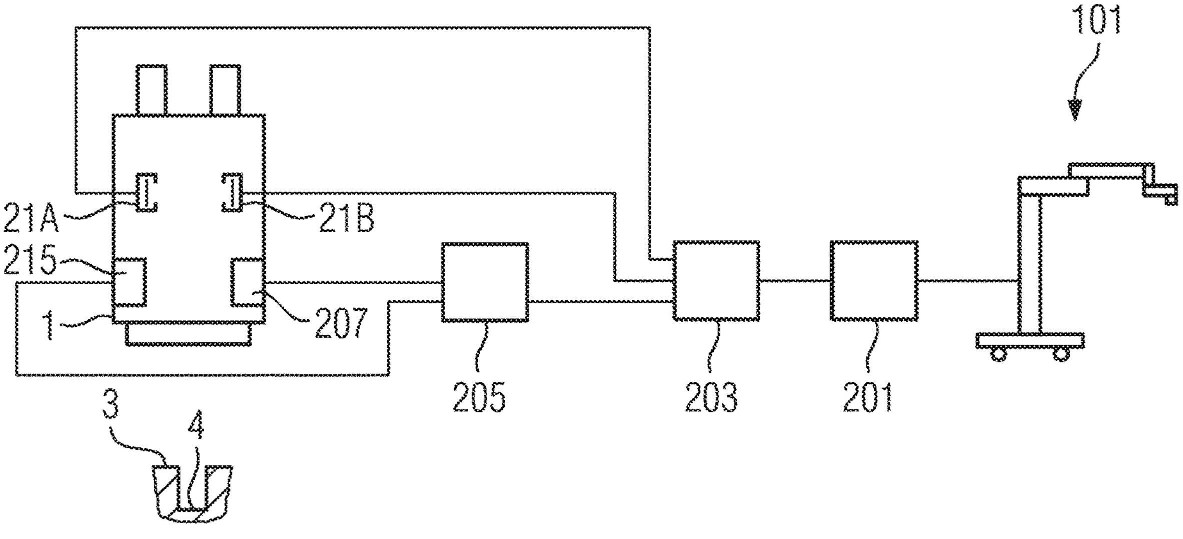
FIG. 8 shows a second example of an operating microscope system embodied according to the invention.

The second exemplary embodiment of the operating microscope system according to the invention, depicted in FIG. 8, differs from the first exemplary embodiment of the operating microscope system according to the invention in that the electronic stereoscopic partial images 210A, 210B are not used to establish the topography of the observation object 3. Instead, the operating microscope 1 is equipped with a topography unit 215, which establishes the topography of the observation object without the aid of the electronic stereoscopic partial images 210A, 210B. In the present exemplary embodiment, the topography unit 215 is a chromatically encoded confocal sensor. A very small pinhole stop, which serves approximately as a punctiform light source, is situated in front of a light source in a confocal sensor. This punctiform light source is focused on an object plane of the observation object with the aid of imaging optics. The light reflected or scattered by the observation object is refocused by the same imaging optics, with a second pinhole stop being situated at the location of the focus. Light which is reflected or scattered out of the focal plane of the imaging optics is refocused at the location of the second pinhole stop by the imaging optics and it can therefore pass the second pinhole stop. Light originating from outside of the focal plane of the imaging optics is not focused at the location of the second pinhole stop by the imaging optics, and so it is substantially blocked by the second pinhole stop. The distance between the focal plane and the imaging optics can now be varied until a maximum intensity is detected behind the second pinhole stop. The distance between the focal plane and the imaging optics then represents the distance of the reflecting or scattering portion of the observation object 3 from the imaging optics. In a chromatically encoded confocal sensor, use is made of dispersive imaging optics which have different focal planes for different wavelengths. It is then possible to deduce the position of the focal plane in the observation object 3 from the wavelength of the light passing the second pinhole stop. By way of lateral scanning of the observation object 3 with the image of the pinhole stop arranged upstream of the light source, it is possible to establish the topography of the observation object with the aid of the confocal sensor. Like in the first exemplary embodiment, the topography established by the topography unit 215 is then forwarded to the processing unit 205, where it is processed further in accordance with the first exemplary embodiment.

In addition to the use of a topography unit 215 based on a chromatically encoded confocal sensor, it is also possible to use a topography unit based on a time-of-flight measurement of the reflected laser pulses. The time-of-flight of the laser pulses in this case depends on the distance of the reflecting surface from the laser and on the distance of the detector for the laser pulses reflected from the reflecting surface, and so it is possible to establish the topography from the time-of-flight if the observation object is scanned laterally by the laser pulses.

In a further alternative, the topography unit can comprise a device for illuminating the observation object by means of a structured light pattern. The topography of the observation object can then be established from the profile of the light pattern in a recorded image of the observation object. By way of example, the profile of the structure of the light pattern can be established from one of the two electronic stereoscopic partial images.

In an even further alternative, the topography unit can be based on optical coherence tomography (OCT). In optical coherence tomography, a light beam is split into a measurement branch and reference branch, wherein the measurement branch is directed to the observation object and the reference branch leads to a reflector. The beams reflected by the observation object and the reflector are then recombined, with constructive interference occurring if the light beams in the measurement branch and in the reference branch have passed over the same length. Here, it is possible to design the path length in the reference branch in a manner dependent on the wavelength when broadband light is used, and so constructive interferences at different wavelengths correspond to different distances of the observation object. The topography of the observation object can then be established by lateral scanning of the observation object by means of the measurement beam.

Figure 9:
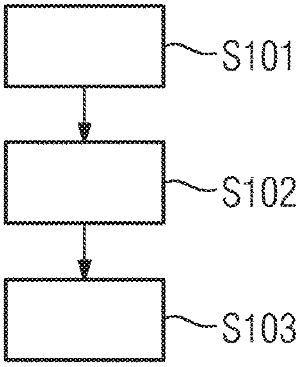
FIG. 9 shows a second exemplary embodiment for the method according to the invention on the basis of a flowchart.

A further exemplary embodiment for such an automated alignment of the operating microscope that the area of the base 4 of the deep operating channel visible in the stereoscopic partial images is maximized is described below with reference to FIG. 9. In a first step 101 of this exemplary embodiment, the medical practitioner using the operating microscope 1 sets the operating microscope in such a way that the image sharpness is optimized at the desired focal depth. With the set focal depth, the operating microscope 1 experiences a preliminary alignment in step 102 in such a way that a portion of the base 4 of the deep operating channel is imaged in focus in the stereoscopic partial images. Due to the shallow depth of field of the observer beam paths of operating microscopes, regions of the observation object 3 which are not at the set focal depth, such as the walls of the deep operating channel, are depicted out of focus in the electronic image. Therefore, the region depicted in focus in the electronic image can be equated to the area situated at the selected focal depth, namely the base 4 of the deep operating channel.

Proceeding from the preliminary alignment of the operating microscope 1, the operating microscope is moved in small steps in step S103 and, after each movement, the image evaluation unit establishes how high the portion of the area in the overall area of the image situated at the focal depth selected on the operating microscope 1 is for the stereoscopic partial images. Aligning the operating microscope 1 and establishing the portion of the area in the overall image area of the respective stereoscopic partial image situated at the selected focal depth is continued in step S103 until the portion of the area in the overall image area of the respective stereoscopic partial image situated at the selected focal depth is at a maximum. This method can also be used if the observer beam path is not a stereoscopic observer beam path. Moreover, it can be used if the visibility of the base of a deep operating channel is merely intended to be maximized in one of two stereoscopic partial images.

Figure 10:
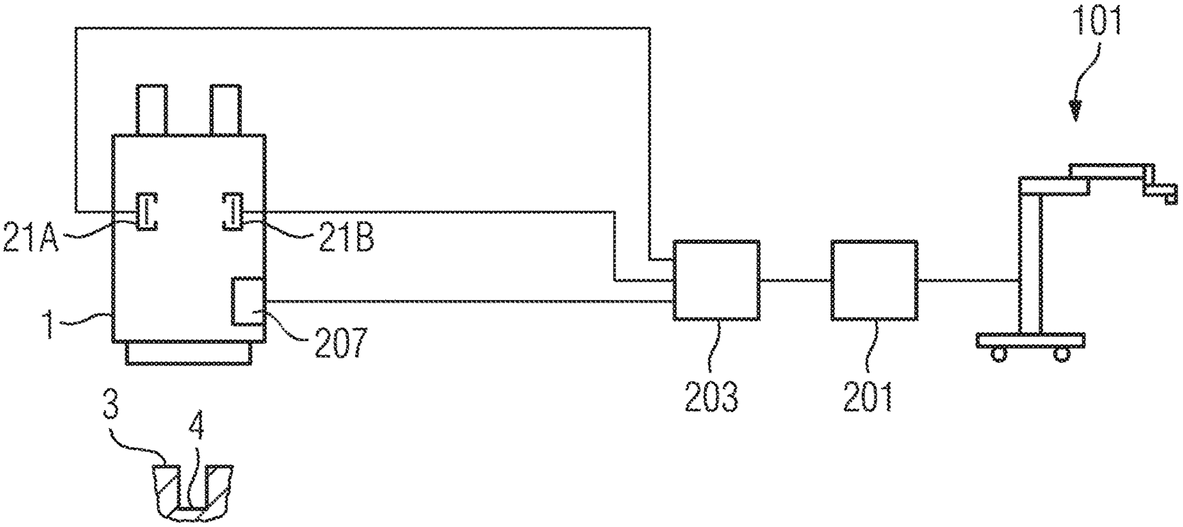
FIG. 10 shows a second exemplary embodiment of an operating microscope system embodied according to the invention.

The topography of the observation object 3 need not be established and the position of the base of the deep operating channel in the coordinate system of the operating microscope 1 is not required to carry out the method for automated alignment of the operating microscope in accordance with the exemplary embodiment described with reference to FIG. 9. The operating microscope system depicted in FIG. 4 can therefore be simplified by omitting the processing unit 205 and the topography unit 209. A corresponding operating microscope system is depicted in FIG. 10. Elements of the operating microscope system depicted in FIG. 10, which correspond to elements of the operating microscope system depicted in FIG. 4, are denoted in FIG. 10 with the same reference signs as in FIG. 4 and are not explained again in order to avoid repetition. The description of the operating microscope system depicted in FIG. 10 is therefore restricted to the description of the differences from the operating microscope system depicted in FIG. 4. In the operating microscope system depicted in FIG. 10, the cameras 21A, 21B are only connected to the image processing unit. Moreover, the detection unit for detecting the set focal depth is not connected to a processing unit 205, but directly connected to the image processing unit 203. Otherwise, the operating microscope system depicted in FIG. 10 does not differ from the operating microscope system depicted in FIG. 4.

Unlike the exemplary embodiments described previously, in which the operating microscope only comprises a single observer beam path, the operating microscope system can contain an operating microscope with a main observer beam path and a co-observer beam path. Here, as a matter of principle, the main observer beam path and the co-observer beam path can in each case have a design like the beam path in the operating microscope 1 described with respect to FIG. 1. A typical configuration of an operating microscope with a main observer and co-observer beam path, in which the observer pupils of the main observer beam path and of the co-observer beam path do not overlap, i.e. in which the stereoscopic partial beam paths of the co-observer beam path and the stereoscopic partial beam paths of the main observer beam path are geometrically separated from one another, is shown in FIG. 11. In this configuration, for which FIG. 11 schematically shows the main objective 218, the pupils 220A, 220B of the main observer beam path and the pupils 222A, 222B of the co-observer beam path, the stereoscopic partial beam paths of the co-observer beam path are rotated by 90 degrees in relation to the stereoscopic partial beam paths of the main observer beam path. If use is made of such an operating microscope, it is advantageous if the operating microscope is initially aligned on the basis of one of the procedures described above in such a way that the region of the base 4 of the deep operating channel visible with the main observer beam path is at a maximum before there is an alignment of the operating microscope under the constraint that the region of the base of the deep operating channel visible with the main observer beam path remains at a maximum in such a way that the region of the base of the deep operating channel visible with the co-observer beam path is also at a maximum. In the example described with reference to FIG. 6, there could be a displacement of the operating microscope perpendicular to the line 212, proceeding from the alignment of the operating microscope depicted in section III of FIG. 6, for the purpose of maximizing the region of the base of the deep operating channel visible with the co-observer beam path. As a result of this, it is possible to remove at least one offset, when necessary, between the visible regions of the base of the deep operating channel in the stereoscopic partial images of the co-observer beam path. However, as a result of the constraint, it may be the case that only a portion of the maximum region of the base of the deep operating channel visible in the main observer beam path is visible in the co-observer beam path as maximum visible region of the base of the deep operating channel.

In principle, the described method can also be used to optimize the illumination of the base of the deep operating channel. Instead of the portion of the base of the deep operating channel, it then is the visible area of an illumination spot on the base of the operating channel, or the image brightness, that is optimized. As a result, the illumination unit can be set in such a way that an ideal illumination of the base of a deep operating channel is carried out. In principle, the control signals for aligning the illumination apparatus can be established with the same methods that were used to establish the control signals for aligning the operating microscope.

The present invention was explained in detail on the basis of exemplary embodiments for explanatory purposes. However, a person skilled in the art recognizes that it is possible to deviate from the described exemplary embodiments and that features of the individual exemplary embodiments can also be combined with one another. Therefore, the present invention is not intended to be restricted to individual exemplary embodiments, but rather only by the appended claims.

LIST OF REFERENCE SIGNS

1 Operating microscope
3 Observation object
4 Base
5 Objective
7 Beam
8A,B Output coupling device
9A,B Partial beam path
10A,B Beam splitter prism
11A,B Magnifying apparatus
13A,B Input coupling device
15A,B Beam splitter prism

19A,B Camera adapter
21A,B Camera
23A,B Image sensor
27 Binocular tube
29A,B Tube objectives
31A,B Intermediate image plane
33A,B Prism
35A,B Eyepiece lens
37A,B Display
39A,B Superimposition optical unit
40 Illumination device
41 Light source
42 Illumination optical unit
43 Deflection mirror
101 Stand
102 Foot switch
105 Stand foot
106 Roller
107 Foot brake
108 Stand column
109 Support arm
110 Spring arm
111 Microscope mount
113 Connection element
114 Holding arm
115 Swivel arm
201 Control unit
203 Image processing unit
205 Processing unit
207 Detection unit
209 Topography unit
210A,B Stereoscopic partial image
212 Line of the offset
214 Trocar sleeve
215 Topography unit
218 Main objective
220A,B Pupil
222A,B Pupil
301 Main observer beam path
303 Co-observer beam path

The invention claimed is:

1. A method for automated alignment of a microscope, which is fastened to a motor-driven mount and/or a motor-driven stand and which has an observer beam path, in view of a visibility of a base of a deep channel in an observation object, the method comprising:

obtaining at least one electronic image from the observer beam path, the observer beam path comprising a first stereoscopic partial beam path and a second stereoscopic partial beam path, the at least one electronic image comprising a first electronic stereoscopic partial image obtained from the first stereoscopic partial beam path and a second electronic stereoscopic partial image obtained from the second stereoscopic partial beam path, registering a focal depth, establishing an image portion constituting the base of the deep channel in the at least one electronic image based on the registered focal depth and information about a position of the base of the deep channel, the image portion comprising a first image portion, which constitutes the base of the deep channel in the first electronic stereoscopic partial image and is established in the first electronic stereoscopic partial image on the basis of the registered focal depth and the information about the position of the base in the deep channel, and a second image portion, which constitutes the base of the deep channel in the second electronic stereoscopic partial image and is established in the second electronic stereoscopic partial image on the basis of the registered focal depth and the information about the position of the base in the deep channel, establishing an alignment of the microscope that maximizes an area of the image portion constituting the base of the deep channel in the at least one electronic image with aid of an image processing unit based on the established image portion, wherein the alignment of the microscope maximizes the first image portion in the first electronic stereoscopic partial image and maximizes the second image portion in the second electronic stereoscopic partial image, and setting the established alignment of the microscope with the motor-driven mount and/or the motor-driven stand.

2. The method as claimed in claim 1, wherein, for purposes of maximizing the first and second image portions constituting the base of the deep channel in the first and second electronic stereoscopic partial images, the image processing unit establishes a magnitude and a direction of an offset of the second image portion constituting the base of the deep channel in the second electronic stereoscopic partial image in relation to the first image portion constituting the base of the deep channel in the first electronic stereoscopic partial image and outputs control signals to the motor-driven mount and/or the motor-driven stand that, for purposes of aligning the microscope, the motor-driven mount and/or the motor-driven stand move the microscope along a line of the offset until the magnitude of the offset is minimized in the first electronic stereoscopic partial image and in the second electronic stereoscopic partial image and, subsequently, the microscope is moved in a direction perpendicular to the line of the offset until a maximum of visible base of the deep channel is depicted in the first electronic stereoscopic partial image and in the second electronic stereoscopic partial image.

3. The method as claimed in claim 1, wherein a transformation, which minimizes a distance measure between a scene depicted in the second electronic stereoscopic partial image and a scene depicted in the first electronic stereoscopic partial image, is established and an ideal alignment of the microscope, which is such that the image portion constituting the base of the deep channel is respectively maximized in the first electronic stereoscopic partial image and the second electronic stereoscopic partial image, is established from the established transformation.

4. The method as claimed in claim 1, wherein the information about the position of the base of the deep channel is obtained by virtue of a region depicted in focus in the electronic image being identified with an area situated at a selected focal depth, and the microscope is aligned in a preliminary fashion and a portion of an area in an image area situated at the selected focal depth is established for the electronic image using the microscope aligned in the preliminary fashion, wherein the alignment and the establishment of the portion of the area in the image area situated at the selected focal depth is continued iteratively until the portion of the area in the image area situated at the selected focal depth is at a maximum in the at least one electronic image.

5. The method as claimed in claim 1, wherein the information about the position of the base of the deep channel is obtained by virtue of a region depicted in focus in the first electronic stereoscopic partial image with an area situated at a selected focal depth being identified and a region depicted in focus in the second electronic stereoscopic partial image with an area situated at the selected focal depth being identified, and the microscope is aligned in a preliminary fashion and a portion of an area in an image area situated at the selected focal depth is established in each case for the first electronic stereoscopic partial image and for the second electronic stereoscopic partial image using the microscope aligned in a preliminary fashion, wherein the alignment and the establishment of the portion of the area in the image area situated at the selected focal depth is continued iteratively until the portion of the area in the image area situated at the selected focal depth is at a maximum in the first electronic stereoscopic partial image and the second electronic stereoscopic partial image.

6. The method as claimed in claim 1, wherein, for the purposes of obtaining the information about the position of the base of the deep channel, a topography of the observation object with the deep channel is established and the information about the position of the base of the deep channel is established with the aid of the established topography of the observation object.

7. The method as claimed in claim 6, wherein a surface normal averaged over the base of the deep channel is established from the established topography and an optical axis of the microscope is oriented in such a way when aligning the microscope that it extends parallel to the averaged surface normal.

8. The method as claimed in claim 6, wherein, for purposes of establishing the topography of the observation object with the deep channel, the topography of the observation object is established from the first electronic stereoscopic partial image and the second electronic stereoscopic partial image.

9. The method as claimed in claim 8, wherein, for purposes of maximizing the first and second image portions constituting the base of the deep channel in the first and second electronic stereoscopic partial images, the microscope is aligned in a preliminary fashion, lacking correspondences for deformation and/or depth maps at a set focal depth established within a scope of establishing the topography in the case of the microscope aligned in a preliminary fashion for the first electronic stereoscopic partial image and for the second electronic stereoscopic partial image and the alignment and the establishment of the lacking correspondences is continued iteratively until the lacking correspondences are minimized.

10. The method as claimed in claim 6, wherein, for purposes of establishing the topography of the observation object, the deep channel is scanned by a confocal sensor.

11. The method as claimed in claim 6, wherein, for purposes of establishing the topography of the observation object, the observation object is illuminated by a laser pulse, as a result of which reflection pulses are generated from laser light of the laser pulse reflected by the observation object, the reflection pulses are detected by a detector, and the topography is established from a difference between a time of an emission of the laser pulse and an arrival time of reflection pulses at the detector.

12. The method as claimed in claim 6, wherein, for purposes of establishing the topography of the observation object, the observation object is illuminated by a structured light pattern and the topography of the observation object is established from an extent of a structure in at least one electronic image of the observation object.

13. The method as claimed in claim 6, wherein the topography of the observation object is established by means of optical coherence tomography.

14. The method as claimed in claim 1, wherein the microscope comprises a main observer beam path and a co-observer beam path, and in which the microscope is initially aligned in such a way that a region of the base of the deep channel visible with the main observer beam path of the microscope is maximized before the alignment of the microscope is varied under a constraint that the region of the deep channel visible with the main observer beam path of the microscope remains maximal for the main observer beam path in such a way that the region of the base of the deep channel visible with the co-observer beam path of the microscope becomes maximal while observing the constraint.

15. The method as claimed in claim 1, wherein the microscope is an operating microscope, the deep channel is an operating channel, use is made of a trocar sleeve with a longitudinal axis for purposes of keeping open the operating channel and, when aligning the operating microscope, an optical axis of the operating microscope is oriented in such a way that it extends parallel to the longitudinal axis of the trocar sleeve.

16. The method as claimed in claim 15, wherein the optical axis of the operating microscope is aligned parallel to the longitudinal axis of the trocar sleeve by virtue of a region of an inner lateral surface of the trocar sleeve visible in the at least one electronic image being determined on a basis of an image of the trocar sleeve obtained by the operating microscope and by virtue of the region of the inner lateral surface of the trocar sleeve visible in the at least one electronic image being minimized by adapting the alignment of the operating microscope.

17. The method as claimed in claim 15, wherein the optical axis of the operating microscope is aligned parallel to the longitudinal axis of the trocar sleeve by virtue of an orientation of the longitudinal axis of the trocar sleeve being established from an image of the trocar sleeve obtained by the operating microscope with aid of a stored 3D model of the trocar sleeve and by virtue of the operating microscope subsequently being aligned parallel to the established longitudinal axis.

18. The method as claimed in claim 1, wherein, moreover, illumination of the base of the deep channel is optimized.

19. A microscope system comprising:

a microscope fastened to a motor-driven mount and/or a motor-driven stand, the microscope comprising at least one camera configured to obtain at least one electronic image from an observer beam path of a base of a deep channel in an observation object, the observer beam path comprising a first stereoscopic partial beam path and a second stereoscopic partial beam path, the at least one electronic image comprising a first electronic stereoscopic partial image obtained from the first stereoscopic partial beam path and a second electronic stereoscopic partial image obtained from the second stereoscopic partial beam path, a detector configured to register a focal depth, an image processing unit connected to the detector and configured to receive the detected focal depth, the image processing unit further being connected to the at least one camera and configured to receive the at least one electronic image, the image processing unit further being configured to:

establish an image portion constituting the base of the deep channel in the at least one electronic image based on the registered focal depth and information about a position of the base of the deep channel, the image portion comprising a first image portion, which constitutes the base of the deep channel in the first electronic stereoscopic partial image and is established in the first electronic stereoscopic partial image on the basis of the registered focal depth and the information about the position of the base in the deep channel, and a second image portion, which constitutes the base of the deep channel in the second electronic stereoscopic partial image and is established in the second electronic stereoscopic partial image on the basis of the registered focal depth and the information about the position of the base in the deep channel, and the received focal depth and which image processing unit establishes such an alignment of the microscope that a maximal portion of the base of the deep channel is visible in the at least one electronic image, and establish an alignment of the microscope that maximizes an area of the image portion constituting the base of the deep channel in the at least one electronic image based on the established image portion, wherein the alignment of the microscope maximizes the first image portion in the first electronic stereoscopic partial image and maximizes the second image portion in the second electronic stereoscopic partial image, and a controller connected to the image processing unit and configured to receive the established alignment and generate control signals that cause the motor-driven mount and/or the motor-driven stand to correspondingly align the microscope on the basis of the established alignment.

20. The microscope system as claimed in claim 19, wherein the observer beam path comprises a main observer beam path and a co-observer beam path, and the image processing unit is configured initially to align the microscope in such a way that a region of the base of the deep channel visible with the main observer beam path is maximal before the alignment of the microscope varies under a constraint that the region of the base of the deep channel visible with the main observer beam path remains maximal until the region of the base of the deep channel visible with the co-observer beam path is maximal while observing the constraint.

21. The microscope system as claimed in claim 19, further comprising a topography unit configured to establish topography of the observation object with the deep channel.

22. The microscope system as claimed in claim 19, further comprising an illumination unit and an optimization apparatus configured to optimize illumination of the base of the deep channel.

* * * * *